Dec. 15, 1942. S. W. RUSHMORE 2,305,276
MANUFACTURE OF PISTON RINGS AND THE LIKE
Filed May 8, 1942
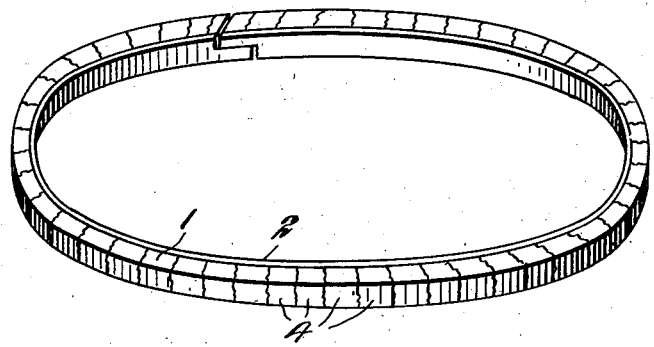
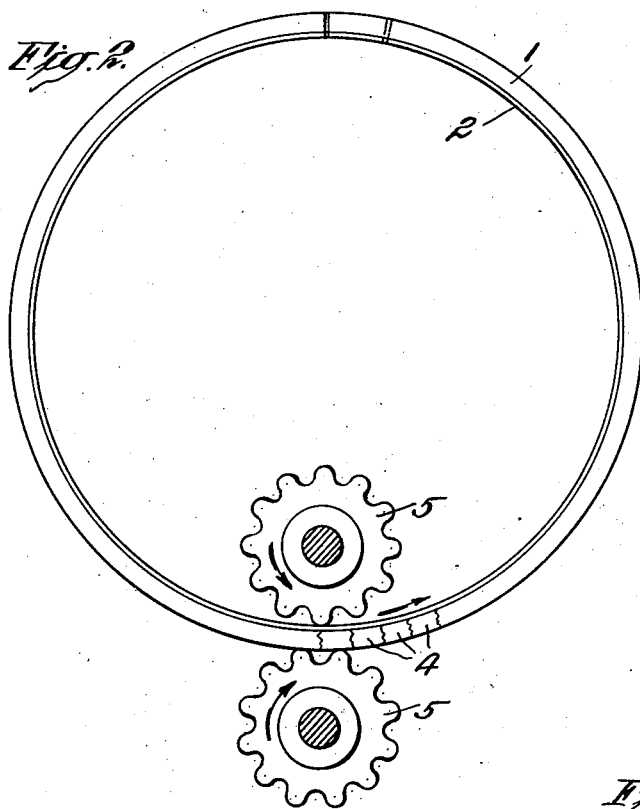
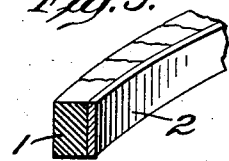
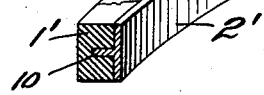
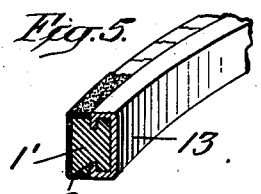
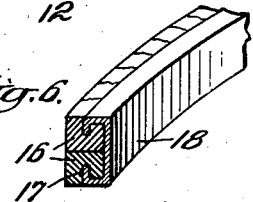
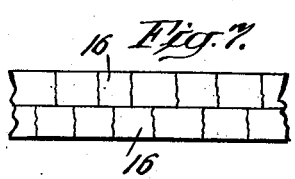
INVENTOR
SAMUEL W. RUSHMORE
BY
ATTORNEY Patented Dec. 15, 1942

2,305,276

UNITED STATES PATENT OFFICE 2,305,276

MANUFACTURE OF PISTON RINGS AND THE LIKE

Samuel W. Rushmore, Plainfield, N. J.

Application May 8, 1942, Serial No. 442,149

3 Claims. (Cl. 309—44)

This invention relates to the manufacture of piston rings for internal combustion engines, or to metallic packing for generally analogous use, and consists of an improved piston ring construction adapted to present important advantages in use over the rings as at present employed and further an improved method for producing the rings efficiently and with substantial economy in manufacture.

An important object of the present improvements is to overcome, to a substantial degree, the compression losses in the motor combustion chamber incident to the customary "out of round" cylinder wear of worn motor blocks and the inefficient sealing action by the piston rings by reason of deficient localized flexibility of the ring structures as commonly employed. To this end I have produced an improved piston ring specially designed to be resiliently expansible as required but with a materially increased and localized flexibility of the ring body adapting it for resiliently and more closely conforming to the inner peripheral contour of worn cylinder walls so as to more effectively seal the piston for better compression of the fuel gases. Important structural features thereof consist in forming the ring as a compound ring consisting of an outer member of cast iron or other suitable material of a relatively fragile character united with or secured to a backing or inner ring member of high resiliency, such as spring steel, adapted to contribute the radially expansive force to the ring structure. The outer and inner ring members are secured, or united as by brazing, and the outer ring member is then subdivided into relatively short ring segments secured as aforesaid to the continuous, expansible inner ring member and thereby producing locally increased flexibility adapting the ring to closely fit to or conform to worn cylinder surfaces and particularly, more effectively to seal cylinder walls worn to out of round or non-circular condition.

The improved compound ring is formed to have a normal expansion to a diameter greater than the cylinder of its intended use and with the usual overlapping joint or end portion permitting resilient contraction on installation within the piston ring grooves in the customary manner. In further accordance with my present invention, the improved ring is formed initially of a continuous or integrally formed outer ring member secured to the likewise single piece inner and resilient base member. After securing of the members, as for instance by brazing, the outer member, preferably of cast iron, is broken for sub-dividing by passing of the ring through suitable deformed rollers or cog wheels designed to effect fracture of the cast metal outer member at short intervals of spacing while deflecting the resilient base member within its elastic range or without permanent set whereby the latter retains its continuity and predetermined resilience for imparting the expanding force to the ring.

The resulting segmental outer face ring structure not only insures closer cylinder wall engagement and in consequence better compression but in addition, by reason of the resulting added and localized flexibility, materially decreases tendency of the rings to become "frozen" within the grooves by hardened carbon deposit as is common with the unitary type of rings, as is readily understood. The fracturing of the outer ring member while compressed relative to the diameter of the cylinder prescribes that there shall be close pressure contact between the segments in use to preclude of leakage therebetween.

In accordance with a further feature of the invention and contributing to the effectiveness of the improved rings, I have incorporated therewith a graphite surface coating adapted by its lubricating properties to improve the ring action. Desirably the graphite may be applied as a compound or paste composed of a hardening vehicle for the graphite adapted to harden upon baking after application of the paste to the ring subsequent to the brazing and fracturing as described. This graphitizing of the face of the ring not only operates to prevent scoring of the cylinder wall but is found to have a beneficial effect upon the cast iron surface structure, particularly as to its graphite content and its penetration of or absorption by the surface structure and the benefits thereof are found to be increased by the inclusion of a small percentage of sulphur in the graphite paste mixture.

The described and other features and advantages of the present improvements will be more fully understood by reference to the accompanying drawing wherein like reference characters of the description are applied to the corresponding parts in the several views.

In the drawing:

Fig. 1 is a perspective view showing a piston ring constructed in accordance with an approved embodiment of the features of my invention.

Fig. 2 is a view illustrating the simplified method of sub-dividing the outer member to produce the segmental contact surface in accordance with my improved method of manufacture.

Fig. 3 is a detailed, sectional view of the ring of Fig. 1 shown in perspective.

Fig. 4 is a similar view showing a desirable modified construction.

Fig. 5 is a similar view showing a further desirable modification.

Fig. 6 is a sectional, perspective view of a modified form having a double fractured ring member and Fig. 7 is a face elevation thereof.

In the approved embodiment of the features of the present invention, as shown in Figs. 1 to 3, the compound ring structure is formed of the outer ring member 1 of cast iron or other suitably fragile material such as compressed metallic powder and secured or united with an inner resiliently flexible ring member 2, desirably of spring steel. The outer ring member, initially formed as a single continuous piece, may desirably be united with the inner ring member by brazing and subsequent to such uniting the outer ring member is suitably sub-divided as shown to provide a segmental cylinder wall engaging surface. In accordance with the invention, this sub-dividing is accomplished by passing the completed or compound ring, while slightly compressed in diameter with relation to the cylinder wall of its intended use, through or between suitably journalled breaker rollers or cogs 5, as shown in Fig. 2, to effect the fracturing of the more fragile outer ring member at short spaced intervals while deflecting the inner ring member within its normal range of flexibility and resilience so as to produce no permanent set and by the nature of the material without fracture thereof. Accordingly, there is produced an improved ring structure having the improved properties of greater localized flexibility with the advantages in use as hereinbefore referred to.

The outer ring member, after fracturing as described, is coated with a graphite paste, desirably having a sulphur addition, and baked thereon; this coating being applied to the outer cylinder wall engaging surface and to the exposed side surfaces of the ring segments as is readily understood.

In Fig. 4 there is shown a desirable modification of my improved ring structure wherein the inner resilient member 2' thereof is formed of T section with a radial flange 10 fitted to a groove in the outer fragile member 1', fractured as shown for articulation and united to the inner member by brazing or by being cemented thereto. After fracturing as described, the outer member is coated with the graphite coating as referred to.

In Fig. 5 a further modified form is shown wherein the outer member 1' is provided with grooves as shown in opposite sides thereof to receive inturned flanges 12 of a channel formed inner resilient base member 13 thereby to unite the members without other bonding therebetween. After fracturing in accordance with my invention, the outer segmental member is graphite coated as shown at 14.

In Figs. 6 and 7 a further modification is shown wherein the outer ring is formed as a double ring member, each member 16 thereof being provided with grooves to receive the flanges 17 of the inner ring member 18. This structure permits of fracturing the outer ring members as shown in Fig. 7 whereby the fractures are non-aligned vertically of the ring for improved sealing action. After fracture, the graphite paste is applied to the exposed surfaces of the outer ring member.

Having described my invention, I claim:

1. A piston ring of the character described comprising a ring structure composed of an outer ring member of fragile material secured to an inner resilient expanding member and said outer member being fractured at relatively closely spaced intervals to be segmental for localized flexibility.

2. A piston ring of the character described comprising a ring structure composed of an outer ring member of fragile material brazed to an inner resilient expanding ring member, said outer member being fractured at relatively closely spaced intervals to be segmental for localized flexibility.

3. A piston ring of the character described comprising a ring structure composed of an outer ring formed of multiple outer ring members of cast iron and an inner ring member of resilient material to which said outer members are secured and said outer ring members being fractured at relatively closely spaced intervals.

SAMUEL W. RUSHMORE.